Sept. 17, 1968    D. A. ANDERSON    3,401,494
METAL STUD FOR POLYSTYRENE FOAM SHEETS
Filed Jan. 23, 1967    2 Sheets-Sheet 1

INVENTOR.
DALLAS A. ANDERSON
BY Schroeder, Siegfried
& Ryan
ATTORNEYS

Sept. 17, 1968            D. A. ANDERSON            3,401,494

METAL STUD FOR POLYSTYRENE FOAM SHEETS

Filed Jan. 23, 1967            2 Sheets-Sheet 2

INVENTOR.
DALLAS A. ANDERSON
BY Schroeder, Siegfried
& Ryan
ATTORNEYS

United States Patent Office 3,401,494
Patented Sept. 17, 1968

3,401,494
METAL STUD FOR POLYSTYRENE FOAM SHEETS
Dallas A. Anderson, 541 Manor Drive,
Spring Lake Park, Minn. 55432
Filed Jan. 23, 1967, Ser. No. 611,110
12 Claims. (Cl. 52—309)

ABSTRACT OF THE DISCLOSURE

The present disclosure is directed to the method and fastening structure for securing sheets of polystyrene foam to a concrete wall and securing gypsum panels over the fastening structure. The metal fastening structure in general form, is channel shaped, having serrated edges to cut or bite into the sheet of polystyrene foam and allow it to be flush with the face of the sheet of foam. The fastener is nailed or secured by power driven pins to the concrete wall and the dry-wall construction is secured to the fastening structure by screws. One variation of the fastener is pressed into the polystyrene sheet at the edge and another variation has tabs formed in the face thereof to secure metal lath thereto for a plaster construction.

---

This invention relates to the field of building construction and more particularly to the field of attaching insulating sheets and gypsum panels to concrete walls.

The use of polystyrene foam sheets or sheets made of any low density synthetic cellular resin material is being used more and more in the construction field and particularly for use as a thermal bearer or insulation when applied to concrete construction. Because the sheets of low density synthetic cellular resin material, hereafter referred to as polystyrene foam, are of a light weight and rather large size, the common practice has been to secure the polystyrene foam sheets to concrete walls of block or poured construction by the use of an adhesive. Another coating of adhesive is then applied to the face of the sheet of polystyrene foam and a gypsum wallboard panel is then glued to the surface of the polystyrene foam sheet. This particular procedure presents several problems, primarily due to the somewhat "flakiness" of the polystyrene foam sheets and because of its softness which results in the sheets being easily torn or punctured. For this reason, attempting to secure the polystyrene foam sheets to a concrete wall is generally not successful where an attempt is made to nail the sheets to the concrete since it merely compresses the foam material around the nails or power-driven pins and the holding qualities subside. In fact, some attempts to overcome this problem have resulted in certain builders using thin sheets of laminated wood which is secured to the polystyrene foam by an adhesive and the gypsum panels are then secured to the laminated wood panels. However, the process still requires two applications of an adhesive and the additional labor of securing the gypsum panels to the laminated wood construction.

By the use of a metal fastener which is channel shaped and generally has saw teeth formed on the edges thereof, a metal stud is created which may be pressed into the polystyrene foam sheets and then be secured to the concrete wall by the use of nails or power-driven pins. There is a sufficient bearing surface in the web of the channel to apply the appropriate pressure to the sheet of polystyrene foam to hold it in place without any appreciable deformation of the material. Sheets of gypsum paneling may then be secured to the metal studs by the use of regular screws employed for the process, the screws having a flat head or "trumpet-shaped" head to engage the gypsum panels.

It is therefore a general object of this invention to provide an improvement in the structure and method for securing insulation and gypsum wallboard panels to concrete wall structure.

It is still another object of this invention to provide a method and structure for securing low density synthetic cellular resin sheets and gypsum panels to concrete structure by eliminating the use of adhesive.

It is a further object of this invention to provide a fastener strip and method of using the same which may be pressed into sheets of polystyrene foam and secure the same to concrete walls through the use of nails or pins and secure the gypsum panels thereto through the use of screws.

It is still another object of this invention to provide a means and method of securing polystyrene foam sheets to concrete by eliminating adhesives and securing metal lath thereto over which plaster may be applied.

These and other objects and advantages of the invention will more fully appear from the following description, made in connection with the accompanying drawings, wherein like reference characters refer to the same or similar parts throughout the several views, and in which.

Figure 1:
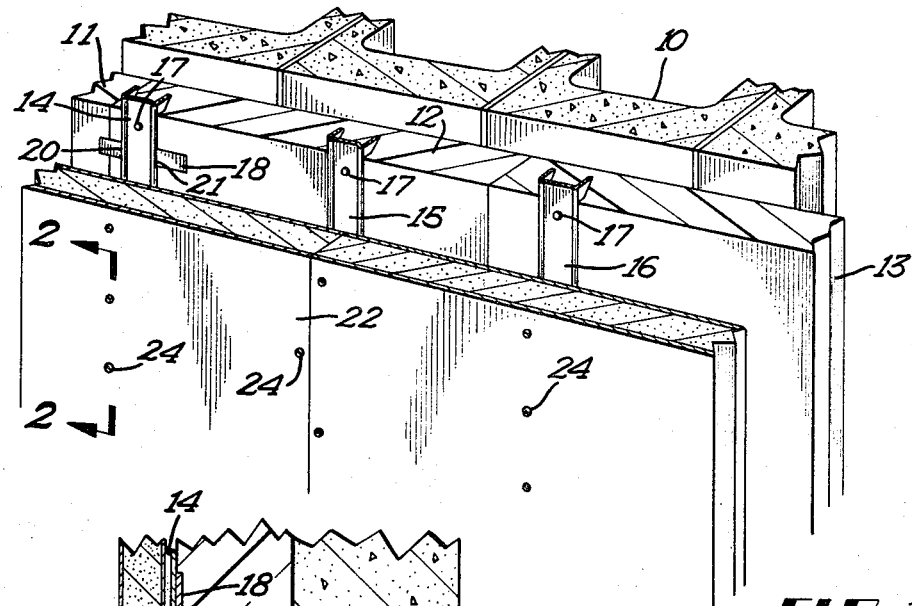
FIG. 1 is a partial elevation view of the arrangement of the wall construction shown in perspective.

In FIG. 1, there is shown a concrete wall 10 which may be formed of concrete blocks or a poured construction. Lying along the face of the concrete wall 10, are sheets, or partial sheets of polystyrene foam 11, 12, and 13. Three fastener channel-like members 14, 15, and 16 are shown in place, members 14 and 15 engaging sheet 12 and member 16 engaging sheet 13. Members 14, 15 and 16 form the metal stud. Each of the members 14 through 16 is secured to concrete wall 10 by a plurality of nails or power-driven pins 17. It will also be observed that sheet 11, in abutting sheet 12, forms a joint adjacent to metal stud 14 and sheet 11 is held in place through the use of a transversely extending locking tab 18 which is extended through a pair of transverse slots 20 and 21, which is shown more clearly in FIG. 4. Secured in facing relationship with sheets 11, 12 and 13 of the polystyrene foam, are a pair of gypsum panels 22 and 23. Panels 22 and 23 are secured to the metal studs 14, 15, and 16 by the use of a plurality of screws 24. Screws 24 were described previously as the type generally having a rather smooth and tapered surface from the head to the shank of the screw so that the panel may be drawn tightly against the metal stud and provide a good bearing surface therefor.

Figure 2:
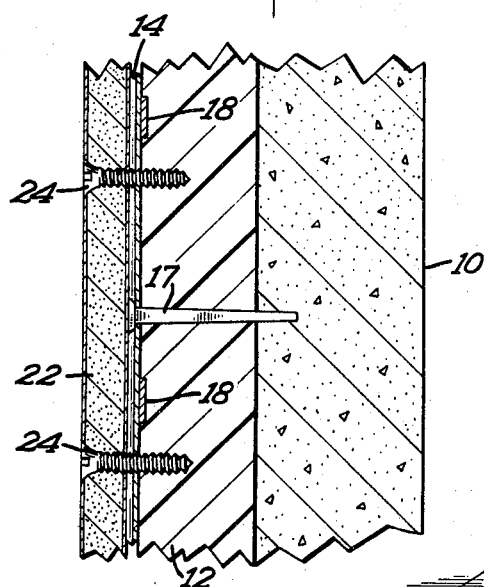
FIG. 2 is a partial cross-sectional view of a typical wall construction using the invention taken along the lines 2—2 in FIG. 1.
Figure 3:
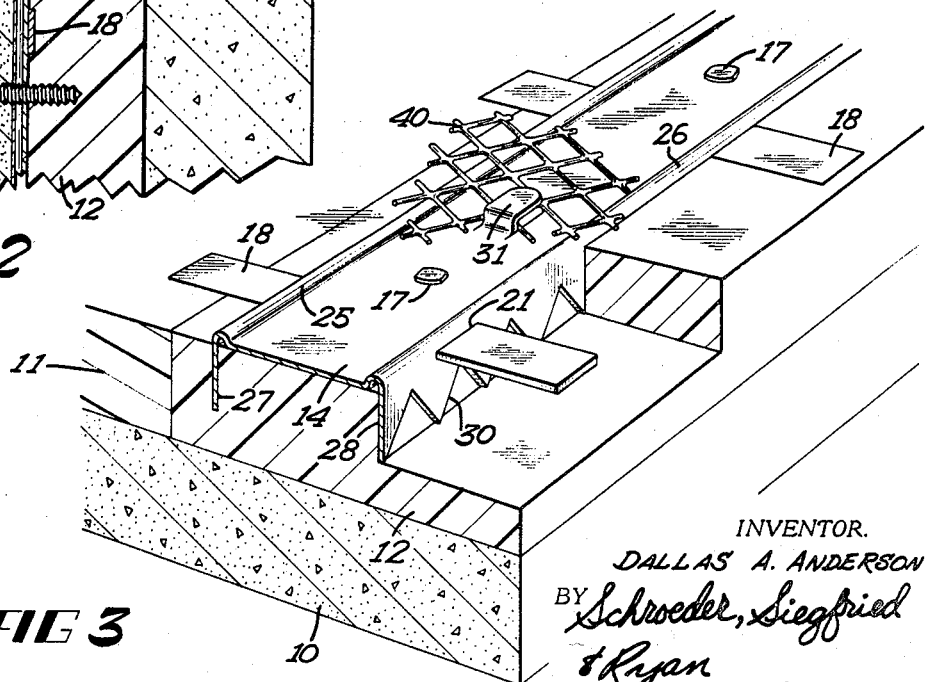
FIG. 3 is an isometric view of the fastener strip in place with metal lath secured thereto.
Figure 4:
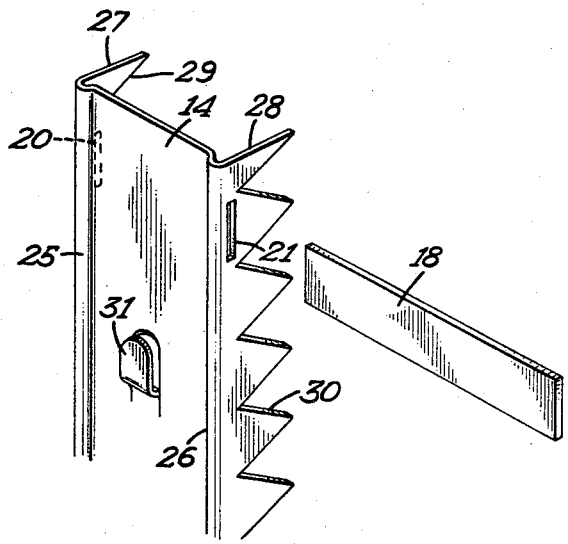
FIG. 4 is an isometric view of a partial portion of the fastener strip.

For a more detailed understanding of the building construction, reference is made to FIG. 2 and particularly to FIG. 4 showing the metal stud in more detail. Channel-like member 14 has a web 15 which is approximately 1⅝ inches wide and has a pair of convex corner beads 25 and 26 which cooperate with a pair of depending flanges 27 and 28 respectively. The flanges 27 and 28 terminate in a pair of serrated edges 29 and 30 respectively, the depth of the teeth being approximately ⅝ of an inch deep when used with polystyrene foam sheets of 1 inch thickness. It will of course be understood that approximately the same proportionate depth would be maintained for different thicknesses of insulating material. Also shown in the structure of FIG. 4, is a tongue-like tab 31 which is stamped from the web 15 of the material and extends outwardly and upwardly and will be explained more fully with respect to FIG. 3. Tabs 18 are approximately 3½ inches long and 1 inch wide.

Figure 6:
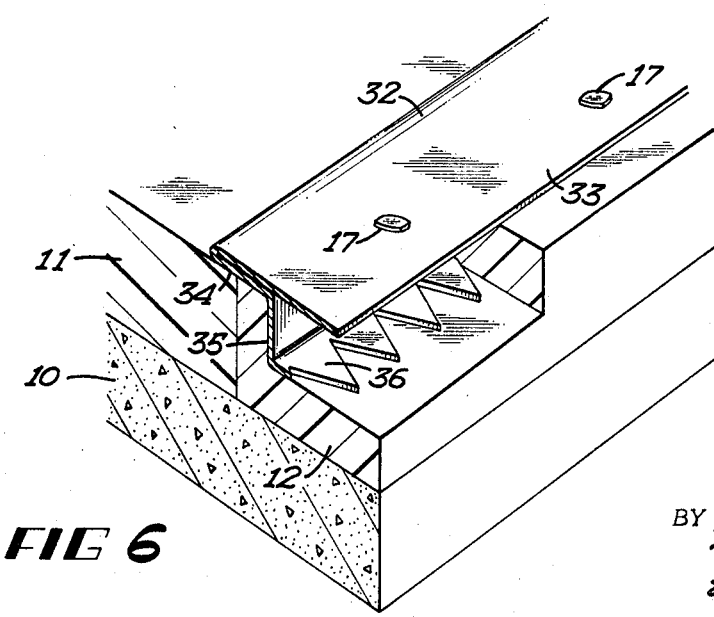
FIG. 6 is an isometric view of a variation of the fastener structure engaging the edge of the sheets of polystyrene foam.

FIG. 6 discloses another variation of a metal stud 32 which is used to hold in place a pair of polystyrene foam sheets such as sheets 11 and 12. The corner of sheet 12 is broken away to show the construction of the stud 32. Stud 32 is formed of a flat elongated strip 33 which has a side portion 34 folded upon itself and a leg 35 depends therefrom which has the end portion 36 extended at right angles thereto and substantially parallel to the elongated strip 33, end portion 36 also being serrated. Thus as seen in FIG. 6, strip 32 is pressed into the edge of polystyrene foam sheet 12 and when secured to concrete wall 10 by suitable means such as nails 17, portion 34 also engages sheet 11 and holds it in place against wall 10. In some cases it may be desirable to add a saw cut or slot to the edge of the sheet of polystyrene foam such as sheet 12 to provide a smoother fit for serrated edge 36. Generally speaking, the studs such as studs 32 or 14 through 16 described previously, are located at intervals of two feet from center to center and may be applied either vertically or horizontally, or if the conditions warrant, the combination of both.

Figure 5:
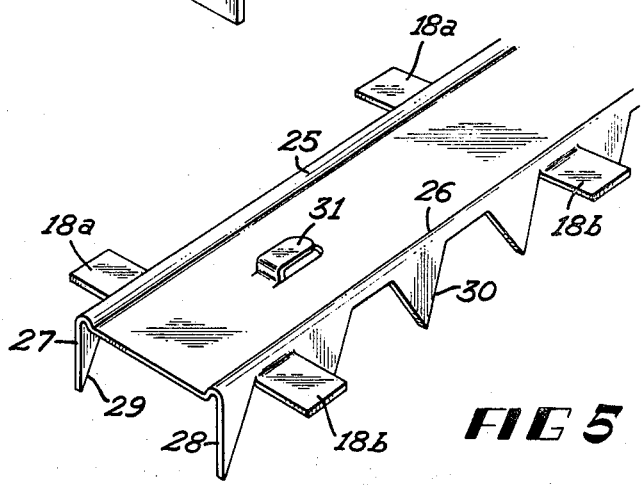
FIG. 5 is an isometric view of a variation of the fastener structure shown in FIG. 4.

FIG. 5 shows a variation of the stud as found in FIG. 4 wherein locking tabs 18a and 18b are formed from flanges 27 and 28 respectively. The tabs are located just below convex beads 25 and 26 by extending the material outwardly and substantially parallel to web portion 15. Thus the tabs will engage the adjacent sheet of polystyrene foam when pressed into another sheet along the edge thereof. The tabs 18a and 18b are unitary with the channel-like member 14 and provide additional bearing surface for the sheets of polystyrene foam.

In FIG. 3, polystyrene foam sheets 11 and 12 are shown abutting each other with a fastener strip or stud 14 pressed into sheet 12 adjacent the edge thereof with tabs 18 extending into locking position for holding sheet 11. Also, tab 31 is shown engaging a section of metal lath 40. It will be recognized that once metal lath 40 is secured to the metal studs 14, that a wet wall may be secured thereto by plastering to provide a finished wall.

The method of using the metal studs will now be described. The channel-like members 14 are pressed into the polystyrene foam sheets and in some instances, it may be desirable to form a slot or saw cut through the polystyrene sheets so that the flange members may be easily inserted into the sheet material. The polystyrene foam sheets are then positioned against the concrete wall and nails or power-driven pins are then driven through the metal studs 14 and into the concrete wall. Where the metal stud is adjacent the edges of two polystyrene foam sheets, tabs 18 are inserted before the channel member is secured to the concrete wall. In the alternative, the structure shown in FIG. 6 is used where the elongated fastener strip is pressed into the edge of the polystyrene sheet and then the other sheet of polystyrene foam is pressed against the depending leg 35 and nails or power-driven pins 17 secure the elongated strip 32 to the concrete wall 10. A gypsum panel such as panel 22 is then placed over the metal studs and screws are then driven through the gypsum panels and into the web 15 of the channel-like member. The screws may be power-driven and generally have a length less than the thickness of the gypsum panels and polystyrene foam sheets so that they do not engage the concrete wall 10.

In those situations where it is desirable to plaster over the insulating sheets of polystyrene foam, tabs 31 are bent over the loops of metal lath 40 to secure them to the metal studs such as studs 14, 15 and 16. The wall is then completed by plastering over the metal lath 40.

While the disclosure herein has been directed primarily to securing a plaster or dry wall construction containing gypsum, it is contemplated that the same methods and structure may be used to secure other types of paneling over a polystyrene foam sheet. For instance, panels generally referred to as wallboard, flake-board, or other laminated wood or plastic sheets, may be used in place of the gypsum panels or plaster construction.

It will thus be apparent that there has been shown and described herein a means of eliminating the costly job of securing the thermoinsulation sheets of polystyrene foam and gypsum panels to each other and to the concrete wall through the use of adhesives. The present structure and method provides a much faster and more efficient construction as well as one which is sturdier and more reliable, since there is no reliance placed upon the polystyrene foam sheets as structural members such as found where the gypsum panels are cemented to the polystyrene foam sheets.

It will, of course, be understood that various changes may be made in the form, details, arrangement and proportions of the parts without departing from the scope of the invention which consists of the matter shown and described herein and set forth in the appended claims.

What is claimed is:

1. In the method of securing sheets of polystyrene foam between gypsum panels and walls formed of concrete construction by metal U-shaped fasteners, the steps which include:
   (a) pressing the U-shaped fasteners into the sheets of polystyrene foam, the penetration of the legs of said U-shaped fasteners being less than the thickness of the sheet of polystyrene foam;
   (b) securing the sheets of polystyrene foam to the concrete walls by nailing through the web of the U-shaped fasteners;
   (c) and inserting screws through the gypsum panels and the web of the U-shaped fasteners, the penetration of the screws being less than the thickness of the sheets of polystyrene foam and gypsum panels but tightened to hold the gypsum panels in place.

2. The method as set forth in claim 1 including the steps of:
   (d) forming slots in the sheets of polystyrene foam to receive the legs of the U-shaped fasteners.

3. The method as set forth in claim 1 including the steps of:
   (e) forming slots transversely aligned from each other in the legs of the U-shaped fasteners adjacent the web between said legs;
   (f) and inserting extension tabs through the slots formed in both legs of said U-shaped fasteners before pressing the U-shaped fasteners into the sheets of polystyrene foam.

4. In the method of securing sheets of polystyrene foam between gypsum panels and walls formed of concrete construction by metal fasteners, each having a depending leg normal thereto and a lip portion, the steps which include:
   (a) pressing the fasteners against the face of the sheet of polystyrene foam and pressing the lip portion of the fasteners into the edge of the sheet of polystyrene foam;
   (b) abutting another sheet of polystyrene foam against the depending leg of a fastener and exposed edge of the sheet of polystyrene foam;
   (c) securing the sheets of polystyrene foam to the concrete walls by nailing through the fasteners;
   (d) and inserting screws through the gypsum panels and fasteners, the penetration of the screws being less than the thickness of the sheets of polystyrene foam and gypsum panels but tightened to hold the gypsum panels in place.

5. The method as set forth in claim 4 including the steps of:
   (e) forming slots in the edge of the sheets of polystyrene foam to receive the lip portion of the fastener.

6. In combination with a concrete wall:
(a) a sheet of polystyrene foam secured to the surface of said concrete wall;
(b) at least one fastener member formed of a substantially flat elongated strip engaging the face of said sheet of polystyrene foam, said fastener member having at least one depending flange formed at substantially a right angle to said elongated strip, the extremity of which penetrates said sheet of polystyrene foam and is gripped thereby;
(c) a plurality of nails securing said fastener member and said sheet of polystyrene foam in place against the concrete wall construction;
(d) a gypsum panel overlaying said sheet of polystyrene foam and fastener member;
(e) and a plurality of screws inserted through said gypsum panel and securing said panel in place, said screws having a length less than the thickness of said sheet of polystyrene foam and said gypsum panel.

7. The structure as set forth in claim 6 including:
(f) two depending flanges formed on said fastener member, the extremities of which have serrated edges and slots formed in said flanges transversely aligned with each other and adjacent a web joining said two depending flanges, said fastener member being secured adjacent an edge of said sheet of polystyrene foam;
(g) another sheet of polystyrene foam having an edge portion abutting said first mentioned sheet of polystyrene foam and adjacent said fastener member;
(h) a locking tab inserted in a pair of said transversely disposed slots of said depending flanges and outwardly of said flanges, one end of said tab engaging the face of said another sheet of polystyrene foam.

8. The structure set forth in claim 6 wherein said fastener member includes:
(i) a pair of convex corner beads formed at the corners created by joining a pair of depending flanges to said flat elongated strip and a plurality of locking tabs extended from said depending flanges parallel to said flat elongated strip but disposed below said convex corner beads.

9. The structure set forth in claim 6 including:
(j) a second sheet of polystyrene foam abutting said first mentioned sheet of polystyrene foam and secured to said concrete wall;
(k) and said flat elongated strip of said fastener member engaging the face of both of said sheets of polystyrene foam adjacent the edges thereof, said depending flange engaging the edge of said first mentioned sheet of polystyrene foam and having the extremity thereof bent to extend substantially parallel to said elongated strip and engaging the edge portion of said first mentioned sheet of polystyrene foam.

10. The structure set forth in claim 6 wherein said sheet of polystyrene foam has slots formed therein receiving said depending flanges of said fastener member.

11. The structure set forth in claim 6 wherein said fastener member includes:
(1) two depending flanges, the extremities of which have serrated edges.

12. An elongated strip member for use with low density synthetic cellular resin sheets and gypsum composition finishing material used in concrete building construction comprising:
(a) a substantially flat web member for engaging the facing side of a panel;
(b) a pair of depending flanges formed at substantially a right angle to said web member, the extremities of which have serrated edges;
(c) a pair of convex corner beads formed at the corners created by joining said pair of depending flanges to said substantially flat web;
(d) a plurality of tongue-like tabs formed in said substantially flat web member extending outwardly and away from said depending flanges, said tabs being constructed and arranged to engage and secure metal lath;
(e) each flange including tabs extending outwardly therefrom in parallel relation to said web member.

References Cited
UNITED STATES PATENTS

| | | | |
|---|---|---|---|
| 1,389,866 | 9/1921 | Georgeson et al. | 52—679 |
| 1,562,784 | 11/1925 | Olsen | 52—370 |
| 2,054,085 | 9/1936 | Johnson | 52—363 |
| 3,171,232 | 3/1965 | Gretter | 52—714 |
| 3,362,120 | 1/1968 | Warren | 52—309 |

HENRY C. SUTHERLAND, *Primary Examiner.*